(12) United States Patent
Belhazy

(10) Patent No.: US 6,295,477 B1
(45) Date of Patent: Sep. 25, 2001

(54) BUS COUPLER BETWEEN A SYSTEM BUS AND A LOCAL BUS IN A MULTIPLE PROCESSOR DATA PROCESSING SYSTEM

(75) Inventor: Michael Belhazy, Paderborn (DE)

(73) Assignee: Siemens Nixdorf Informationssysteme Aktiengesellschaft, Paderborn (GE)

( * ) Notice: Subject to any disclaimer, the term of this patent is extended or adjusted under 35 U.S.C. 154(b) by 0 days.

(21) Appl. No.: 09/202,443
(22) PCT Filed: Jun. 4, 1997
(86) PCT No.: PCT/DE97/01119
§ 371 Date: Dec. 14, 1998
§ 102(e) Date: Dec. 14, 1998
(87) PCT Pub. No.: WO97/48055
PCT Pub. Date: Dec. 18, 1997

(30) Foreign Application Priority Data

Jun. 13, 1996 (DE) .............................................. 196 23 668

(51) Int. Cl.[7] .................................................. G05B 19/18
(52) U.S. Cl. ................................ 700/5; 711/141; 711/146
(58) Field of Search .................................... 700/5, 24, 29, 700/25, 82; 711/119, 121, 143, 141–147; 710/130, 101; 709/201

(56) References Cited

U.S. PATENT DOCUMENTS

| | | |
|---|---|---|
| 4,445,174 * | 4/1984 | Fletcher .................................... 700/5 |
| 4,755,930 | 7/1988 | Wilson, Jr. et al. .................. 711/122 |
| 5,097,409 | 3/1992 | Schwartz et al. ..................... 711/119 |
| 5,367,660 * | 11/1994 | Gat et al. .............................. 711/119 |
| 5,519,839 * | 5/1996 | Culley et al. ......................... 711/122 |
| 5,701,413 * | 12/1997 | Zulian et al. ......................... 709/205 |

FOREIGN PATENT DOCUMENTS 0 481 233 A2  4/1992 (EP) .

OTHER PUBLICATIONS

Scalable Shred–Memory Multiprocessor Architectures, Thakkar, et al., pp. 71–74.

Computer Architecture A Quantitative Approach, Patterson, et al., pp. 654–721.

* cited by examiner

Primary Examiner—William Grant
Assistant Examiner—Kidest Bahta
(74) Attorney, Agent, or Firm—Schiff Hardin & Waite

(57) ABSTRACT

A method and system for a coherence protocol for buffer memories which covers interventions in multiprocessor data processing units, wherein a bus coupler maps the coherence protocol of a system bus onto a local bus and, in the event that an intervention relates to a buffer line which is in the write register, transfer this buffer line from the write register via the local bus to the intervention register.

2 Claims, 1 Drawing Sheet

BUS COUPLER BETWEEN A SYSTEM BUS AND A LOCAL BUS IN A MULTIPLE PROCESSOR DATA PROCESSING SYSTEM

BACKGROUND OF THE INVENTION

1. Field of the Invention

The method and system of the present invention relate to the organization of multicomputer systems having a system bus which is common to a number of modules as well as additional bus systems which are local to the modules.

2. Description of the Prior Art

To improve system performance, multicomputer systems have buffer memories linked to each processor, usually called caches. To simplify programming, various measures, called cache coherence for example as described in the book "Computer Architecture—A Quantitative Approach" by J. L. Hennessy and D. A. Patterson, San Francisco 1995, are taken to ensure that, despite the data copies in the buffer memories, the entire memory of the multicomputer system is accessed uniformly and consistently at any time.

In such multicomputer systems, which a hierarchy of bus systems, it is expedient to have additional intermediate stores (registers) for individual cache lines. These registers may conflict with the cache contents, however. In particular, the case in which data in a write register has to be transferred to the system bus, like data from an intervention register, demands appropriate circuitry for both registers.

Accordingly, an object of the present invention is to reduce the outlay for dealing with such conflicts.

SUMMARY OF THE INVENTION

This object is achieved in a method and system wherein the data from the write register is transferred not directly, but indirectly, to the system bus via the local bus and the intervention register. Consequently, the outlay is reduced in that the write register supplies the data via the local bus to the intervention register in the same way as the processors so that the intervention register cannot discern any difference.

Accordingly, in an embodiment of the present invention, a system is provided for operating a coherence protocol for buffer memories which covers interventions in multiprocessor data processing units, wherein the system includes: a plurality of processors, each processor having a buffer memory containing a buffer line; at least one local bus connected to the plurality of processors; a system bus; a bus coupler connecting the system bus to the at least one local bus wherein the coherence protocol is mapped from the system bus onto the at least one local bus, the bus coupler including at least one intervention register and at least one write register which are both connected to the at least one local bus for read access and which are both connected to the system bus for write access, the at least one intervention register further including a device for subblock interchange; and wherein the at least one write register is particularly connected to the at least one local bus such that, where an intervention relates to content of the at least one write register, the content can be transferred via the at least one local bus to the at least one intervention register.

In another embodiment of the present invention, a method is provided for operating a coherence protocol for buffer memories which covers interventions in multiprocessor data processing units, wherein the method includes the steps of: mapping the coherence protocol from a system bus onto a local bus via a bus coupler, wherein the local bus is connected to processors which respectively have buffer memories containing buffer lines; transferring the buffer lines from the respective buffer memories to an intervention register in the bus coupler via the local bus at the instigation of the bus coupler; transferring the buffer lines from the intervention register to the system bus; writing a first buffer line to a write register in the bus coupler via a buffer memory at the instigation of the respective processor wherein it is specified that the first buffer line is to be transferred via the system bus to a main memory; providing the intervention register with a device for subblock interchange; and transferring the first buffer line from the write register to the intervention register via the local bus in the event that a request is made via the system bus for a buffer line which is in the write register.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
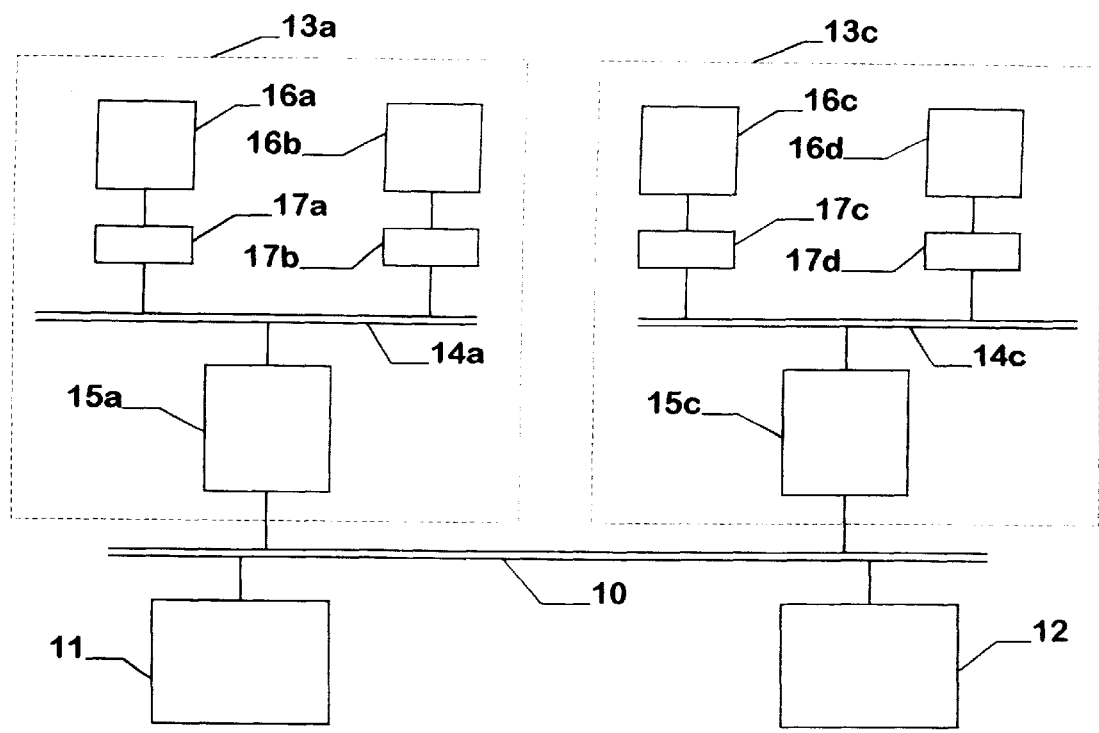
FIG. 1 shows a schematic representation of a schematic representative of a modular multiprocessor computer system having two bus couplers.

FIG. 1 shows a modular multicomputer system having a system bus 10, a number of processor modules 13a, 13c, one of a number of possible memory modules 11 and other modules linked to the system bus 10, for example an I/O module 12.

Each processor module 13a, 13c contains a bus system 14a, 14c which is local to the respective module and is connected to one or more processors 16a . . . d via buffer memories 17a . . . d, respectively. This connection is functionally shown as a series connection of buffer memory 17a . . . d and processor 16a . . . d, respectively, any intention to place a restriction on the actual implementation. Between the local bus 14a, 14c and the system bus 10, each module holds a bus coupler 15a, 15c which converts the signal protocols and, in particular, implements the protocols for maintaining cache coherence.

Figure 2:
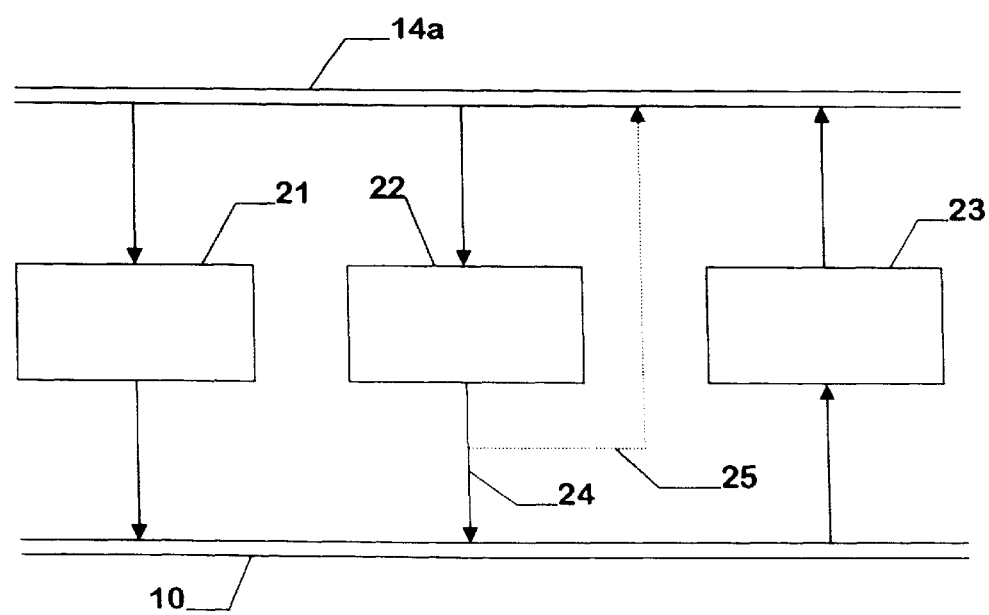
FIG. 2 shows a schematic representation of the intervention, write and read registers from one of the bus couplers from FIG. 1.

To this end, as indicated in FIG. 2, it is typical for three intermediate registers, namely the intervention register 21, the write register 22 and the read register 23, to be used. The read register 23 is used when, for example, the processor 16a requests a data word which is not located in its cache 17a (nor in the adjacent cache 17b on the same local bus 14a). The appropriate cache line containing the data word is then requested by the coupler 15a on the system bus 10 and, when it is received, is initially temporarily stored in the read register 23 before being transferred via the internal bus 14a to the cache 17a which made the request.

If a cache line in the cache 17a is displaced and has to be written back via the system bus 10 to the main memory 11, it is initially temporarily stored in the write register 22 and then transferred via the system bus 10.

Apart from very simple coherence protocols, the present invention provides the possibility of the only valid copy of a cache line being located in one of the cache memories, for example 17a, and not in the main memory 11. If a processor, for example 16c in the module 13c, requests a data item from a cache line in the module 13a, then the module 13a undertakes the data transfer on the system bus 10 instead of the main memory 11. This is called "intervention". In this instance, protocols on the system bus 10 are preferably used in which the address phase and the associated data phase may have other address or data phases inserted between them. In response to any necessary intervention, the cache line is therefore initially transferred to the intervention register 21 via the internal bus 14a and then sent to the receiver using the data phase associated with the initiating address phase on the system bus 10.

The registers 21, 22 and 23 are usually necessary simply because the internal bus 14a and the system bus 10 are of different design. In particular, the internal bus 14a is easily capable of simultaneously transferring a cache line of 64 bytes because, from a technical point of view, it is possible to produce an internal bus having 512 lines on a printed circuit board designed using multilayer technology. For a system bus with plug-in modules, smaller data widths, for example 64 bits, are customary. In particular, the system bus is usually only capable of a lower speed because the speed is restricted not only by the poor electrical properties of the connectors but also by the relatively long lines which are determined by the size of the backplane. Therefore, in order to be able to freely select the frequency on the internal bus for a specified frequency on the backplane, it is expedient to decouple the bus systems via registers. When the data is transferred, for example from the registers to the system bus, or vice versa, space-division multiplexing is converted to time-division multiplexing, or vice versa a. In this case, a cache line is called a block and, in particular, the quantity of data which can be transferred on the system bus in parallel is called a subblock.

In order to reduce the waiting time, when a data request is made by a cache, until the data word which is needed first from a cache line is received, subblock interchange is used. For this, the subblock is not transferred in the order of increasing addresses of the data words but, rather, it starts with the data word requested in each case, which even may be in the middle of a block. Subblocks whose addresses have been interchanged in this manner may appear in the intervention register 21 and in the read register 23, but not in the write register 22, whose transfer to the main memory is, after all, a filing operation which may be done in any, order.

The introduction of a local bus 14a, 14c creates additional conflicts for cache coherence. In particular, the situation may arise in which a displacement in the cache 17a means that the cache 17a, or its processor 16a, has output a cache line via the internal bus 14a, 14c with the aim of writing this cache line back to the main memory 11. Hence, when transfer on the internal bus 14a has finished, the copy in the write buffer register 22 is the sole valid one in the system (otherwise, the coherence protocol would not have specified anything being written back to the main memory 11 at all). The coupler 15a thus tries to allocate an appropriate address cycle to the system bus in order to transfer the content of the write register 22 via the system bus 10 to the main memory 11. Before this is accomplished, however, another processor may request data from this very cache line, which therefore has to come from the write register 22. The coupler circuit is designed to satisfy such inquiries from the intervention register 21, however. Disregarding the inefficient solution of terminating the inquiry in the hope that, by the time it is repeated, the write operation might have taken place, the data therefore has to be transferred from the write register 22 to the system bus 10. At first glance, this appears to be possible without any difficulty, as the write register 22 has a data link 24 to the system bus anyway.

In practice, however, a problem arises inasmuch as the data in the write register 22 now has to be passed to the system bus with subblock interchange, even though this would not be necessary for writing. The write register would therefore have to be supplemented by a multiplexer which is able to effect the desired subblock interchange for transfer to the system bus.

The present invention makes use of the fact that the intervention register 21 already has this device and is usually unoccupied. An additional data path 25 from the write register 22 to the internal bus 14a is therefore introduced, and the content of the write register 27 is transferred via the internal bus to the intervention register 21 and, from there, to the system bus with the correct subblock interchange.

Although this solution appears unfavorable and complex at first glance, it has turned out to be efficient and very simple to implement. Any intervention in which the data is located in the write register 21 instead of in a cache 17a . . . d remains unchanged throughout control of the intervention register 21. Thus, considerably reduces the complexity of control in comparison with previous solutions. It is merely necessary to activate the additional data link 25 instead of the relevant cache 17a . . . d in order to place the data onto the internal bus. In so doing, during an intervention, a cache 17a . . . d places the data onto the internal bus as an entire cache line anyway. This new data path 25 is less complex than a multiplexer, which places the data onto the system bus in a different order, and has the further benefit of the lower control complexity. As the lower bandwidth of the system bus generally means that it requires more data cycles than the internal bus to transfer an entire cache line, the roundabout way via the internal bus does not have much of a delaying effect. In addition, the write register 22 has become free again as a result of the transfer to the intervention register 21.

In the description, the main memory 11 is depicted as a logic unit. It may be formed by one or more memory modules connected to the system bus. Alternatively, or in addition, the processor modules 13a, 13c may also hold a memory behaving as an independent memory 11 from the viewpoint of each of the other modules.

The present invention also may be broadened to the extent that a number of intervention registers are provided and the resultant control allows additional parallel work. As such, a further intervention register is filled via the internal bus while the first intervention register continues to transfer its data via the system bus.

Although the present invention has been described with reference to specific embodiments, those of skill in the art will recognize that changes may be made thereto without departing from the spirit and scope of the invention as set forth in the hereafter appended claims.

I claim as my invention:

1. A system for operating a coherence protocol for buffer memories which covers interventions in multiprocessor data processing units, the system comprising:

a plurality of processors, each processor having a buffer memory containing a buffer line;

at least one local bus connected to the plurality of processors;

a system bus;

a bus coupler connecting the system bus to the at least one local bus wherein the coherence protocol is mapped from the system bus onto the at least one local bus, the bus coupler including at least one intervention register and at least one write register which are both connected to the at least one local bus for read access, and which are both connected to the system bus for write access, the at least one intervention register further including a device for subblock interchange; and wherein the at least one write register is particularly connected to the at least one local bus such that where an intervention relates to content of the at least one write register, the content can be transferred via the at least one local bus to the at least one intervention register.

2. A method for operating a coherence protocol for buffer memories which covers interventions in multiprocessor data processing units, the method comprising the steps of:

mapping the coherence protocol from a system bus onto a local bus via a bus coupler, wherein the local bus is connected to processors which respectively have smaller memories containing buffer lines;

transferring the buffer lines from the respective buffer memories to an intervention register in the bus coupler via the local bus at the instigation of the bus coupler;

transferring the buffer line from the intervention register to the system bus;

writing a first buffer line to a write register in the bus coupler via a buffer memory at the instigation of the respective processor wherein it is specified that the first buffer line is to be transferred via the system bus to a main memory;

providing the intervention register with a device for subblock interchange; and transferring the first buffer line from the write register to the intervention register via the local bus in the event that a request is made via the system bus for a buffer line which is in the write register.

* * * * *